United States Patent
Bottine et al.

(10) Patent No.: US 11,010,709 B2
(45) Date of Patent: May 18, 2021

(54) METHOD FOR UPDATING ASSOCIATION DATA BETWEEN ARTICLES AND LOCATIONS

(71) Applicant: SES-imagotag, Nanterre (FR)

(72) Inventors: Philippe Bottine, Boulogne-Billancourt (FR); François Robin, Paris (FR)

(73) Assignee: SES-imagotag

( * ) Notice: Subject to any disclaimer, the term of this patent is extended or adjusted under 35 U.S.C. 154(b) by 517 days.

(21) Appl. No.: 15/747,550

(22) PCT Filed: Jul. 25, 2016

(86) PCT No.: PCT/FR2016/051930
§ 371 (c)(1),
(2) Date: Jan. 25, 2018

(87) PCT Pub. No.: WO2017/017366
PCT Pub. Date: Feb. 2, 2017

(65) Prior Publication Data
US 2018/0218316 A1    Aug. 2, 2018

(30) Foreign Application Priority Data
Jul. 27, 2015 (FR) ...................................... 1557153

(51) Int. Cl.
*G06Q 10/08* (2012.01)
*G06F 16/23* (2019.01)
*G06K 19/07* (2006.01)

(52) U.S. Cl.
CPC ....... *G06Q 10/087* (2013.01); *G06F 16/2379* (2019.01); *G06K 19/0723* (2013.01); *G06Q 10/08* (2013.01)

(58) Field of Classification Search
CPC .. G06Q 10/087; G06Q 10/08; G06F 16/2379; G06K 19/0723
See application file for complete search history.

(56) References Cited

U.S. PATENT DOCUMENTS

| 2008/0198001 A1* | 8/2008 | Sarma | G06Q 10/087 340/539.1 |
| 2011/0102144 A1* | 5/2011 | Okina | G06Q 30/02 340/5.91 |

(Continued)

FOREIGN PATENT DOCUMENTS

| JP | 2011096038 A | * | 5/2011 |
| JP | 2014199645 A | * | 10/2014 |
| WO | 2013153290 A1 | | 10/2013 |

OTHER PUBLICATIONS

International Search Report for Application No. PCT/FR2016/051930, dated Oct. 14, 2016.

(Continued)

*Primary Examiner* — A. Hunter Wilder
*Assistant Examiner* — Joseph M Mutschler
(74) *Attorney, Agent, or Firm* — Lerner, David, Littenberg, Krumholz & Mentlik, LLP

(57) ABSTRACT

The invention concerns a method for updating association data between articles in a retail area and locations of said retail area, said method comprising the steps according to which, —a reading device acquires a sequence of tag identifiers comprising at least two tag identifiers of which the electronic shelf tags are adjacent, one of said adjacent electronic shelf tags being said electronic shelf tag to be located, and another of said adjacent electronic shelf tags being an electronic shelf tag of which the location is known, the reading device transmits the sequence of identifiers to a computer system that updates the association data from the sequence of tag identifiers, by determining: the articles associated with the tags of the sequence of tags, the respective locations of said articles from the order of the tags in the sequence of tags.

20 Claims, 3 Drawing Sheets

(56) References Cited

U.S. PATENT DOCUMENTS

2013/0339151 A1  12/2013  Bottine et al.
2015/0178767 A1   6/2015  Wu et al.

OTHER PUBLICATIONS

French Preliminary Search Report for FR Patent Application No. 1557153, dated Feb. 12, 2016.

\* cited by examiner

METHOD FOR UPDATING ASSOCIATION DATA BETWEEN ARTICLES AND LOCATIONS

CROSS REFERENCE TO RELATED APPLICATIONS

The present application is a national phase entry under 35 U.S.C. § 371 of International Application No. PCT/FR2016/051930, filed Jul. 25, 2016, published in French, which claims priority from French Patent Application No. 1557153, filed Jul. 27, 2015, all of which are incorporated herein by reference.

GENERAL TECHNICAL FIELD AND CONTEXT OF THE INVENTION

The present invention relates to the association between articles of a retail area and locations of said retail area.

Information relative to articles presented for sale in a retail area is generally displayed by means of labels especially displaying the price of the article with which a label is associated, as well as other information such as the price by weight, etc.

The need for displaying updated information has justified the implementation in many retail areas of electronic shelf labels, more commonly known by their acronym ESL, having a screen on which the display of information is remote-controlled.

The utility of such systems, in the region of shelving in a retail area such as a supermarket, hypermarket or any other retail area, is essentially to display for the consumer, for each article presented for sale, a price corresponding reliably to the price as featured in the central registry of the site, i.e., the price to be effectively used at checkout for payment of the article.

Another advantage of these known systems is to make automated price changes in much shorter times than with a manual display, whether for specific promotional periods on the site, for all or some of the articles presented for sale, to recover tariff changes, for dealing with situations of inflation where prices must be increased very frequently, etc.

The communications capacities of ESLs have recently been amplified by fitting them with a short-range radiofrequency peripheral, of NFC (Near Field Communication) or RFID (Radio Frequency Identification) type, to take advantage of the equipment of clients in retail areas in intelligent communication mobile terminals. A current example of such a mobile terminal is a mobile phone of smartphone type, which offers both possibilities for connection and processing of appropriate information.

As a result, interaction between the ESL and the client terminal offers the latter novel services such as the display of additional information on product with which the ESL is associated. In particular, patent application WO2013/153290 describes the advantageous exploitation of these communication capacities by transmitting to the mobile terminal of the client information spatially located associated with the location of said mobile terminal. The mobile terminal is located by way of identification and location of at least one shelf label with which the mobile terminal starts communicating. Such location produces considerable precision, of the order of a few centimeters, whereas geolocation methods based on internal triangulation from beacons emitting a radio signal at best enable precision of the order of a meter only, which prevents knowing which product the client is located, and therefore greatly restricts the possibilities for interactions based on location.

But, locating the terminal from the ESLs supposes precise and correct knowledge of the location of said ESLs. The layout of a retail area is normally described by a planogram. A planogram is a set of association data among articles of a retail area and locations of said retail area. The planogram determines which products must be at which height, on which shelves and over how many linear meters.

As it is, planograms currently used are theoretical visions of what should be the retail area. In fact, they are typically defined generically, for a plurality of shops of similar size, for which the same arrangement and the same goodwill is provided. As a result, the layout of a given retail area is done based on the theoretical planogram corresponding to the size of the retail area. In fact, the reality of the organization of the retail area differs substantially from this theoretical planogram. In fact, it is common for of the order of 10 to 15% of articles present in the retail area not to be on the planogram, for example because these articles are specific to the retail area, and have not been integrated into the planogram designed for a collection of retail areas. Also, the arrangement of articles in the retail area can vary over time, due to mismatch of products and adaptations made by the operators of the retail area, for example for seasonal products such as those put on display only at Christmas time or back-to-school time.

The result is that the planogram never complies with reality, and the location calling on this planogram suffers from incapacity of the planogram to reflect reality. But the inaccuracy of the planogram brings up other drawbacks, especially at the management level of stock and other commercial aspects, since the planogram is used for example to estimate the numbers of articles on the shelves, based on the theoretical extent of their presence, which wrongly can lead to unanticipated disruptions in stock.

PRESENTATION OF THE INVENTION

A general aim of the invention is to eliminate all or some of the defects of linking devices of the prior art by proposing a method for keeping the planogram updated and in accordance with the real arrangement of products in the retail area.

For this purpose, a method is proposed for updating association data between articles of a retail area and locations of said retail area, said retail area having a plurality of shelf labels distributed in said retail area, each of said shelf labels being associated with an article and being disposed near a location associated with said article, each of said shelf labels being fitted with a label identifier of its own, said method comprising the steps according to which, for adding at least one shelf label:

a reading device acquires a sequence of label identifiers comprising at least two label identifiers whereof the electronic shelf labels are adjacent in a scrolling direction of the locations of the retail area, one of said adjacent electronic shelf labels being said added electronic shelf label, and another of said adjacent electronic shelf labels being an electronic shelf label whereof the location is known, the reading device transmits the sequence of identifiers to a computer system, the computer system updates the association data from the sequence of label identifiers, by determining the articles associated with the labels of the sequence of labels, the respective locations of said articles from the order of the labels in the sequence of labels.

This method is advantageously completed by the following features, taken singly or in any of their technically possible combinations:

- the acquisition of the sequence of label identifiers comprises the provision by an operator of the reading device, of an indication of relative positioning, relative to the location of the added label, of the adjacent label whereof the location is known to the computer system, said indication of relative positioning being transmitted by the reading device to the computer system;
- the scrolling direction of the locations of the retail area is known, and an indication of relative positioning, relative to the location of the located label, of the adjacent label whereof the location is known to the computer system, is deduced from the acquisition order of the label identifiers of the sequence of label identifiers;
- the reading device transmits to the computer system data relative to the association between the identifier of the added electronic label and the reference of an article with which said added electronic label is associated;
- several electronic shelf labels are added, said added electronic shelf labels being adjacent to each other in a scrolling direction of the locations of the retail area, and the acquisition of the sequence of label identifiers by the reading device comprises the acquisition of the label identifiers of said electronic shelf labels added in the order of their arrangement relative to the electronic shelf label whereof the location is known;
- each electronic shelf label of said sequence is fitted with a radiofrequency peripheral and the reading device acquires the identifier of said electronic shelf labels by setting up communication via radiofrequency with said electronic shelf labels;
- the reading device comprises a displacement measuring member, and the method comprises determination of the displacement of the reading device between the acquisition of the identifier of the electronic shelf label whereof the location is known and the acquisition of the identifier of the electronic shelf label to be located;
- a distance between the electronic shelf label whereof the location is known and the electronic shelf label to be located is determined from the displacement of the reading device between the acquisition of the identifier of the electronic shelf label whereof the location is known and the acquisition of the identifier of the electronic shelf label to be located, and the computer processing system uses said distance to update the planogram;
- the method comprises the steps according to which:
    - the reading device acquires a label identifier of an electronic shelf label,
    - a dimension characteristic of the location associated with the electronic shelf label is entered in the reading device,
    - said dimension characteristic of the location is transmitted with the label identifier to the computer processing system.

The invention also relates to a computer program product comprising program code instructions for executing the method according to the invention, when said program is executed on a computer.

The invention also relates to a system for managing association data between articles of a retail area and locations of said retail area, comprising:

- a plurality of electronic shelf labels, each of said shelf labels being associated with a label identifier of its own,
- a reading device adapted to acquire the label identifiers of said plurality of electronic shelf labels and the references of the articles associated with said electronic shelf labels,
- a computer system storing association data between articles of a retail area and locations of said retail area, configured to receive from the reading device the label identifiers acquired by said reading device, said management system being adapted to implement the method according to the invention.

PRESENTATION OF THE DRAWINGS

Other features, aims and advantages of the invention will emerge from the following description which is purely illustrative and non-limiting and which must be considered in conjunction with the appended drawings, in which.

DETAILED DESCRIPTION

Figure 1:
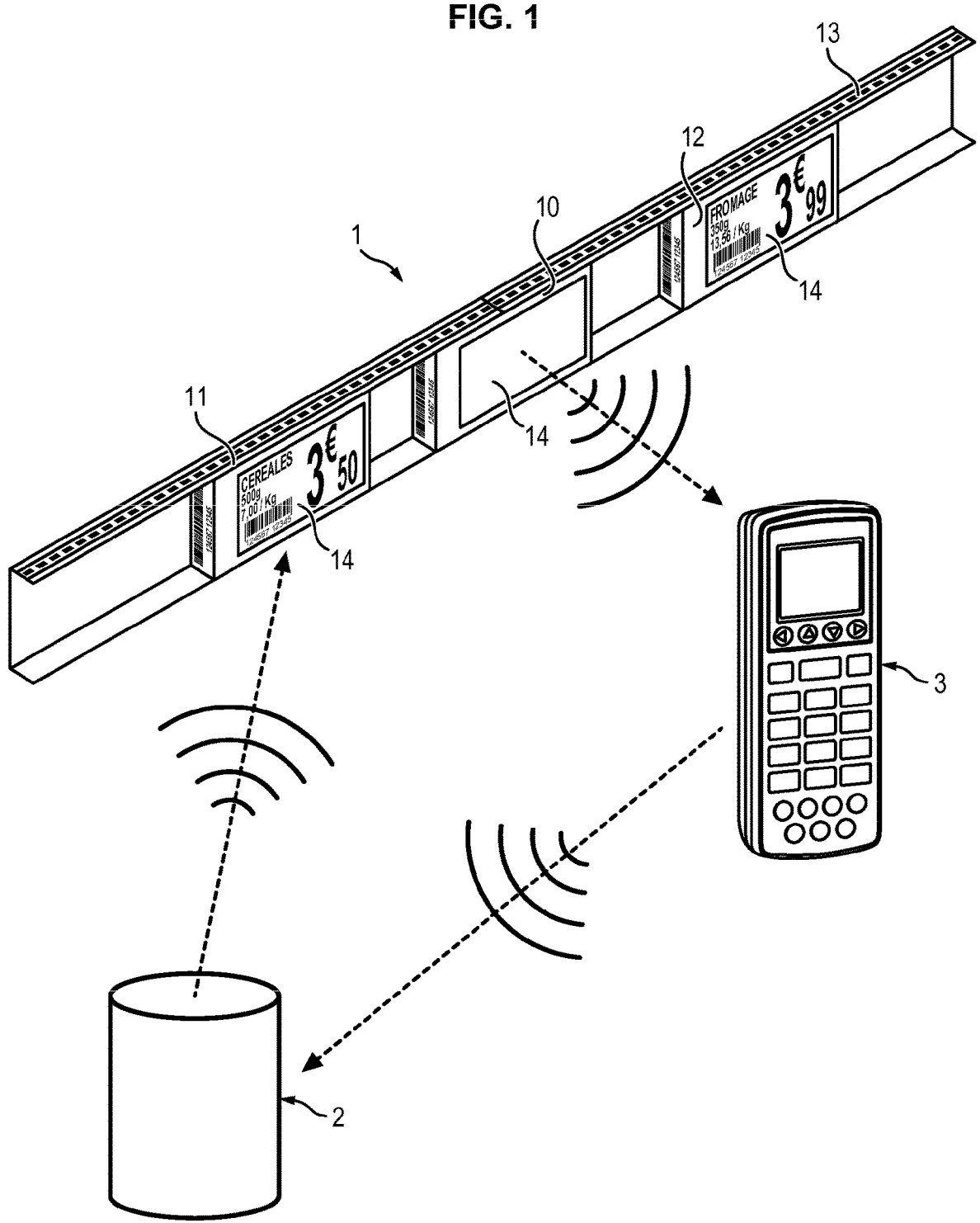
FIG. 1 is a diagram showing a system according to a possible embodiment of the invention.

FIG. 1 shows, with an illustrative and non-limiting objective, a data communication system for corresponding to a possible embodiment of the invention, comprising a reading device 3, a central server 2 and a sequence 1 of electronic shelf labels (ESTs).

The reading device 3 is capable of communicating with a central server 2. This reading device 3 is preferably fitted with information display means, such as a screen, for a user of said reading device 1, and input means such as a keypad, buttons, and/or a touch screen. Communication between the reading device 3 and the central server 2 can be set up by means of any communications network, at least partially wireless, especially via a wireless network of DECT, WIFI or 3G type. So, communication can be set up by passing through the internet network to which the central server 2 is connected.

The ESLs are distributed in the retail area. The ESLs show strong spatial density, typically ten labels per square meter, on average, but with considerable variability. Each ESL is identified by a unique label identifier of its own. This label identifier therefore identifies unequivocally a single ESL only, of the retail area. Each of said shelf labels is associated with an article and is disposed near a location associated with said article.

FIG. 1 illustrates a sequence 1 of ESL 10, 11, 12 put in place along a shelf rail 13 for presentation of articles. Such an ESL comprises a display screen 14 for the display of information relative to an article with which it is associated. This information typically comprises the price of the article, and other information usually available in a retail area, for example the price per kilogram for a food product. The ESL also comprises a plastic casing containing the functional constituents of the ESL.

In particular, the electronic label comprises a radiofrequency communication module for receiving data representative of information relative to an article coming from a central station connected to the computer system 2, a memory for storing said data, and a microcontroller for controlling the display of information relative to the article. These different functional constituents are placed on a printed circuit board housed in the casing. The ESL also comprises a radiofrequency peripheral with which the reading device 3 can set up communication to acquire the label identifier of said ESL. The reading device 3 is accordingly adapted to set up wireless communication with the ESL.

The radiofrequency peripheral of the electronic label comprises an antenna and an electronic chip of NFC (Near Field Communication) or RFID (Radio Frequency Identification) type. A radiofrequency peripheral of NFC type operates for example on a frequency of 13.56 MHz such as a radiofrequency peripheral of RFID HF type.

The central server 2 comprises computer processing means including at least one processor and a memory in which association data relative to the association between articles of a retail area and locations of said retail area are stored, said association data constituting the planogram.

The memory of the central server 2 also stores data relative to the association between the label identifier and a location of the retail area which corresponds to the location of the ESL identified by said identifier, as well as to the article with which the ESL is associated. In this way, by way of the label identifier, the location of the ESL identified by said identifier and the article to which it refers can be found.

The method updates the association data between articles of a retail area and locations of said retail area. In case of change in the association of an article with the ESL in the region of a location, for example when an article is substituted by another at the same location, the operator making the change of article simply has to successively acquire the identifier of the ESL corresponding to this location and the reference of the article corresponding to this location, and send data to the computer system relative to the association between the identifier of the ESL and the reference of the article. The data sent to the computer system are used to update the association data between the articles of the retail area and the locations of said retail area, i.e., the planogram, since the location of the ESL can be found by means of the label identifier of the latter.

The problem with updating the planogram arises especially when the arrangement of the ESLs is modified, dues to displacement of an ESL, and more precisely when an ESL sequence has to be modified by addition of at least one label, to the extent where removing a label merely needs associated data to be deleted. It is then necessary to know the location of the displaced ESL, whereof the location is unknown. This is therefore an ESL to be located relative to the other ESLs in the retail area, to update the planogram.

The method thus proposes updating association data between articles of a retail area and locations of said retail area during displacement of at least one ESL, by means of acquisition, by the reading device 3, of at least two label identifiers whereof the ESLs are adjacent, in a scrolling direction of the locations of the retail area, and whereof one of the identifiers corresponds to the ESL to be located, and the other to an ESL whereof the location is known.

By way of illustration, the present invention is described in detail in terms of adding an ESL. This is the configuration which is illustrated in FIG. 1. By selecting a direction for reading electronic labels from left to right in FIG. 1, the added label 10 is the central label, framed by the preceding label 11 and the following label 12. It should be noted that physical placing of the ESL 10 in its location can be done before or after the method which to be described.

Figure 2:
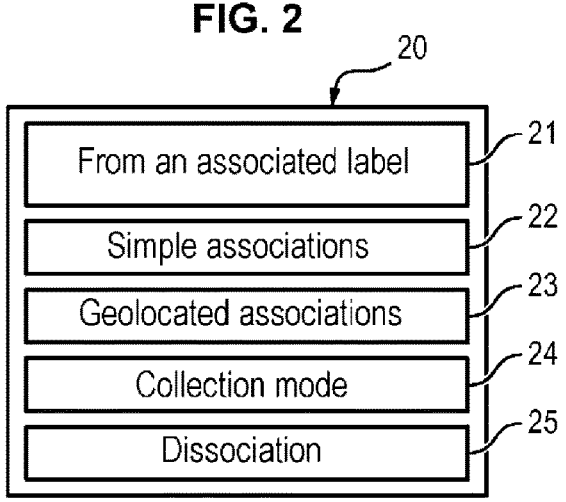
FIGS. 2, 3 and 4 are examples of menus displayed by the reading device within the scope of implementing the invention according to a possible embodiment.

FIG. 2 illustrates a non-limiting example of a menu 20 which can be presented by the reading device 3. Several possibilities are offered to the operator. A first functionality 21 called "From an associated label" consists of locating an ESL to be located by means of an associated ESL whereof the location is known. A second functionality 22 called "Simple association" consists of associating an ESL whereof the location is known with an article by acquiring its article identifier. A third functionality 23 called "Geolocated associations" consists of associating an ESL with a location by manually advising the location. A fourth functionality 24 called "Collection mode" consists of sequentially locating several ESL to be located. Finally, a fifth functionality 25 called "Dissociation" consists of dissociating an ESL from an article.

Figure 3:
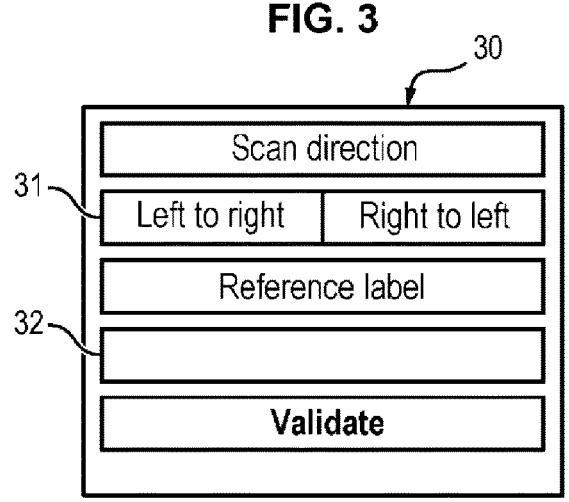

Hereinbelow, interest is shown more particularly in the first functionality 21 and the fourth functionality 24. In terms of the first functionality 21, once the operator has chosen the latter, another menu 30 such as that of FIG. 3 is presented. To determine the location of the added ESL 10, acquisition of the sequence of label identifiers comprises the information by an operator of the reading device 3, of an indication of relative positioning of an adjacent label 11 or 12, whereof the location is already known, relative to the added label 10.

The operator uses the reading device 3 to acquire (step S1) a label identifier of an ESL 11 or 12 adjacent to the location of the added ESL 10, a location which can be either already occupied by the added ESL 10 or intended to receive the added ESL 10. In this way, the ESL whereof the label identifier is acquired is the preceding ESL 11 or the following ESL 12. As indicated earlier, this acquisition is made preferably by wireless communication of NFC type. This adjacent ESL becomes the reference label, whereof the identifier appears in the scope 32 of the menu 30.

The operator also points out an indication of relative positioning of the adjacent label relative to the added label 10 (step S3). In the example of FIG. 3, this is the scrolling direction, by choosing a scan direction 31 in the menu 30: from left to right or from right to left. The operator therefore indicates whether the ESL whereof the identifier has just been acquired is the preceding ESL 11 or the following ESL 12 by selecting the appropriate field, then he validates his indication.

The reading device 3 can also propose a menu to the operator giving him the choice between the designation of the ESL whereof the identifier has just been acquired as preceding ESL or following ESL to enter the indication of relative positioning of the adjacent label relative to the added label 10.

It is possible to enter the indication of relative positioning of the adjacent ESL whereof the location is known relative to the location of the added ESL 10 before or after acquisition of the label identifier of said adjacent ESL whereof the location is known.

The operator uses the reading device 3 to acquire the label identifier of the added ESL 10, preferably by wireless communication of NFC type, then optionally advises the reference of the article intended to be associated with said associated label, if the latter is not yet associated with said article. This step can also be taken before or after acquisition of the label identifier of said adjacent ESL whereof the location is known and/or information of the indication of relative positioning of the adjacent ESL whereof the location is known relative to the location of the added ESL 10.

There are different possibilities for advising the reference of the article. The most common consists of scanning a barcode of the article, which generally encodes the reference of the article. The reading device 3 is provided with a barcode reader for this purpose. Alternatively, the operator can manually input the reference by means of the input means of the reading device, including a keypad, real or virtual. If the article is provided with a radiofrequency peripheral such as an RFID chip, the reading device 3 can acquire the reference of the article by setting up communication with said radiofrequency peripheral.

The reading device 3 transmits (step S2) to the computer system 2 the sequence of label identifiers comprising the identifier of the adjacent label 11, 12 and the label identifier of the added ESL 10. The reading device 3 also transmits the indication of relative positioning of said adjacent ESL 11 or 12 relative to the added ESL 10. The data relative to the association between the identifier of the added ESL 10 and the reference of an article with which said added ESL 10 is associated can also be transmitted.

Although the description above deals with the location of one ESL at the same time for the sake of simplicity, it is possible to locate several ESLs adjacent to each other in a scrolling direction of the locations of the retail area. This is the fourth functionality known as "Collection mode" of the menu 20 of FIG. 2. In this case, acquisition of the sequence of label identifiers by the reading device comprises acquisition of the label identifiers of said electronic shelf labels added in the order of their arrangement in the scrolling direction.

More precisely, the operator uses the reading device 3 to acquire a label identifier of an ESL adjacent to the location of the added ESL, a location which can be either already occupied by the added ESL 10 or intended to receive the added ESL 10. In this way, the ESL whereof the label identifier is acquired is the preceding ESL 11 or the following ESL 12.

An indication of relative positioning of the adjacent ESL relative to the added ESL 10 is then determined. In this respect, the operator can advise the indication of relative positioning relative to the added ESL 10 of the adjacent ESL 11 or 12 whereof the location is known to the computer system, said indication of relative positioning being transmitted by the reading device to the computer system. This ESL 11 or 12 whereof the location is known therefore serves as reference for the locations of the added ESLs 10. The indication of relative positioning can also be deduced because the scrolling direction of the reading device 3 before the ESLs is predefined. The chronological order of the acquired references determines the relative positioning of the ESL to which these references belong.

The operator then acquires the identifiers of the added ESL 10 in the order, in terms of proximity, of the arrangement of locations of the added ESLs relative to the ESL 11 or 12 whereof the location of the computer system is known. In this way, with addition of two ESLs between ESLs 11 or 12, whereof the location is known, the operator acquires the identifier for example of the preceding ESL 11, then indicates the direction of displacement, or this is the ESL preceding the locations of the added ESLs 10. The operator then acquires the label identifier of the ESL closest to ESL 11, then of the one farthest from the ESL 11.

It should be noted that the information of relative positioning transmitted to the computer system 2 can comprise a relative distance between the ESL whereof the location is known and the ESL to be located 10. This distance can be acquired by measuring the displacement of the reading device 3 between the moment when it acquires the identifier of the ESL whereof the location is known and the moment when it acquires the identifier of the ESL to be located. For this purpose, the reading device 3 comprises a displacement measuring member, and the method comprises determination of the displacement of the reading device 3 between the acquisition of the identifier of the electronic shelf label whereof the location is known and the acquisition of the identifier of the electronic shelf label to be located.

For example, the reading device 3 can be fitted with an accelerometer for determining by integration the displacement from said reading device 3 between the two acquisitions, and therefore for deducing the distance. Knowing this distance faithfully reports the relative positioning of the ESL to be located relative to the ESL whereof the location is known. It is also possible to consider as an ESL the location of which is known a dummy ESL, i.e., not associated with an article, constituting a reference mark for locating the other ESLs. This is the case for example with an ESL placed at an end of a shelf for marking the latter.

The information acquired by the reading device 3, specifically the label identifiers, the information on relative positioning, and optionally the association data between the articles of the retail area and the ESLs, are transmitted to the computer system 2, preferably by means of a wireless connection.

The computer system 2 therefore receives information, and uses it to update (step S3) the association data between the articles of the retail area and the locations of said retail area, i.e., the planogram. By way of the sequence of label identifiers, the computer system determines the location of the added ESL 10. From the reference of the article transmitted by the reading device 3 at the same time as the label identifier of the added ESL 10, the computer system 2 also determines the article associated with the added ESL 10. As there is correspondence between the location of the article associated with the added ESL 10 and the location of said added ESL 10, the computer system at the same time determines the location of the article associated with the added ESL 10. The planogram is then modified so that said article corresponds to this location.

The planogram preferably presents a listing of the locations of the retail area taking the form of a cadastre, with location of said locations by means of a referential or a set of coordinates representative of the spatial organization of the retail area. For example, a first coordinate can designate the shelf of the retail area, while a second can designate a section of the shelf, a third the level of the shelf, and a fourth the order of the location on this level. A section of the shelf can especially be defined as being the extent of the shelf over which the levels are continued. A break in the tiering therefore means a shift to another section.

In this way, an ESL and an article are associated with each location. If any modification to the arrangement of locations of the ESLs causes addition or withdrawal of ESL, this modification is immediately relayed to the computer system 2, and integrated into the planogram. Similarly, in case of change in the association of an article with the ESL in the region of a location, for example when one article is substituted for another at the same location, the operator making the change of article to simply needs to successively acquire the identifier of the ESL corresponding to this location, and the reference of the article corresponding to said location, and send to the computer system data relative to the association between the identifier of the ESL and the reference of the article, as explained during addition of an ESL. But it may not be necessary to acquire the identifier of an adjacent ESL to the extent where the arrangement of the ESLs has not been modified.

The data sent to the computer system are used to update the association data between the articles of the retail area and the locations of said retail area, i.e., the planogram, since the location of the ESL can be found by means of the label identifier of the latter.

Also, it can be provided to modify a spatial characteristic of a location, and especially the fronting or "facing", which is the visible shelving length, facing the client, used on shelving for presentation of an article. In fact, the locations of the planogram can have different facings, as a function especially of the characteristics of the articles which are placed there, and dealer choices (publicity, shelf storage). In this way, the possibility of modifying the fronting or "facing", i.e., the presentation width of a location, further improves the representativeness and performance of the planogram.

For this purpose, the method can comprise the steps according to which:
  the reading device 3 acquires a label identifier of an electronic shelf label,
  a dimension characteristic of the location associated with the electronic shelf label is entered in the reading device 3,
  said dimension characteristic of the location is transmitted with the label identifier to the computer processing system.

Figure 4:
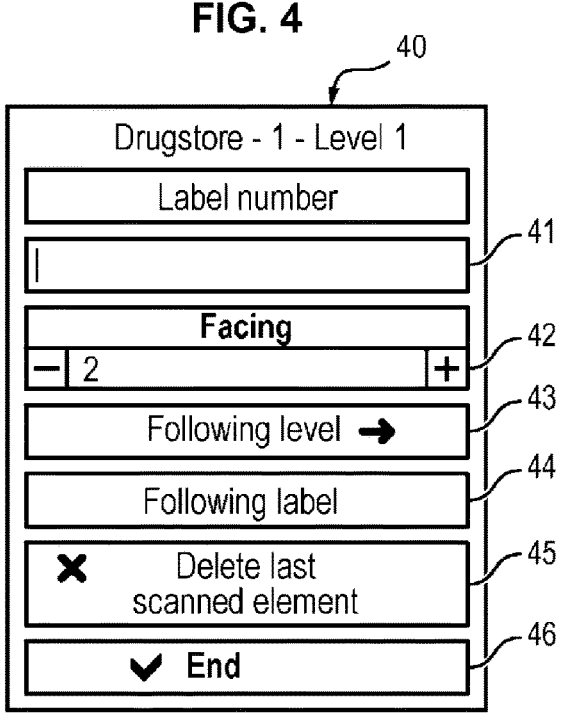
Figure 5:
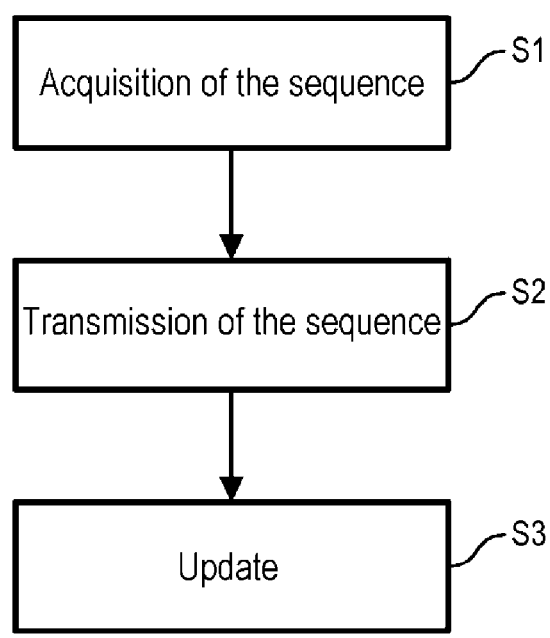
FIG. 5 is a diagram illustrating different steps of the method according to a possible embodiment of the invention.

For example, the reading device 3 can propose a menu 40 such as illustrated in FIG. 4. A first field 41 corresponds to the label number, i.e., the label identifier, which is entered by the operator or by the reading device 3 following acquisition of the label identifier of an ESL. A second field 42 corresponds to the dimension characteristic of the location associated with the ESL identified in the first field 41, in this case the facing. The operator can modify the value of this characteristic. The button "Next label" 44 serves to validate the characteristics associated with the ESL (label number, facing) and moves to information of the characteristics of another ESL.

Other functionalities can be offered by this menu 40. It is for example possible to move to the following level 43, i.e., to the next shelving level. The button 45 deletes the last scanned element, which is a cancel button. Finally, the button 46 noted "End" validates. The planogram is updated with each change in the arrangement of the articles in the retail area. It is therefore representative of the real arrangement of each retail area, and therefore is no longer a theoretical vision of what should be the arrangement of this retail area.

Also, the data relative to the association between the identifier of the ESL and the reference of an article with which said ESL is associated are used by the computer system 2 to transmit to said ESL the display data linked to this article, for example by radio transmission so that the information on the article is displayed by the ESL. Also, the computer system 2 offers the possibility of modifying the planogram manually, for example by assigning articles to some locations, especially to initialize the planogram, and the association between an article and the ESL is adapted to take into account the manual modification made.

Exact knowledge of the location of products, reflected by the planogram, by means of the locations of the ESLs, contributes several advantages:
  location of the consumer, via determination of the location of the ESL whereof the identifier is communicated by the consumer, such as provided by application WO2013/153290, is more precise and exact;
  the possibility of advising the location of articles, the consumer or an operator of the retail area;
  better management of articles for sale, both for managing stock and for organizing sales policy,
  better productivity of operations undertaken in the retail area due to highly precise knowledge of the location of products, especially for order picking, for a cycle counting, or even tidying away articles left around the shop out of their location.

The invention claimed is:

1. A method for updating a planogram registered in a computer system, to reflect an addition of a shelf label in a shelf of a retail area, wherein the planogram comprises association data between articles of the retail area and locations of the retail area, the method comprising:
  acquiring, by a reading device, a sequence of label identifiers comprising a label identifier of an added shelf label reflecting an addition of the shelf label in the shelf of the retail area, and also comprising a label identifier of an adjacent shelf label which is adjacent to the added shelf label according to a scrolling direction of the locations of the retail area,
  the retail area having a plurality of shelf labels distributed in the retail area, each of the shelf labels being associated with a respective article and being disposed near a respective location associated with the article, each of the shelf labels being associated with a label identifier of its own,
  wherein the adjacent shelf label is either the preceding shelf label or the following shelf label in the shelf according to the scrolling direction and in relation to the added shelf label,
  wherein a location of the adjacent shelf label is preliminarily known in the planogram;
  identifying a location corresponding to the added shelf label in the shelf of the retail area, comprising:
    transmitting, by the reading device, the sequence of label identifiers to the computer system,
    updating, by the computer system, the planogram on the basis of the sequence of label identifiers, by determining:
      articles associated with the labels of the sequence of label identifiers, and
      locations of the articles, on the basis of an obtained location of the added shelf label, wherein the obtained location is a location in the planogram which is adjacent to the preliminarily known location of the adjacent shelf label.

2. The method according to claim 1, wherein acquiring the sequence of label identifiers comprises receiving, by the reading device, an indication of relative positioning, relative to the location of the added shelf label to be located, and the adjacent label whereof the location is known to the computer system, the indication of relative positioning being transmitted by the reading device to the computer system.

3. The method according to claim 2, wherein receiving the indication of relative positioning comprises:
  identifying, from the acquisition order of the label identifiers of the sequence of label identifiers, the indication of relative positioning of the added shelf label, relative to the location of the adjacent label.

4. The method according to claim 1, further comprising:
  transmitting, by the reading device and to the computer system, data corresponding to an association between the label identifier of the added shelf label and a reference of an article with which the added shelf label is associated with.

5. The method according to claim 1,
wherein the added shelf label is one of a plurality of electronic shelf labels to be located, the electronic shelf labels to be located being adjacent to each other in the scrolling direction of the locations of the retail area, and
wherein the acquiring comprises acquiring the label identifiers of the plurality of electronic shelf labels to be located in the order of their arrangement.

6. The method according to claim 5,
wherein each electronic shelf label of the sequence is fitted with a radiofrequency peripheral, and
wherein the acquiring comprises acquiring, by the reading device, the label identifiers of the electronic shelf labels by setting up communication via radiofrequency with the electronic shelf labels and the reading device.

7. The method according to claim 1, wherein the reading device comprises a displacement measuring member, and the method further comprises:
determining, by the reading device, the displacement between the label identifier of the adjacent shelf label whereof the location is preliminarily known and the label identifier of the added shelf label.

8. The method according to claim 7, further comprising:
determining, by the reading device, the distance between the adjacent shelf label whereof the location is known and the added shelf label to be located from the displacement of the reading device between the identifier of the adjacent shelf label whereof the location is known and the identifier of the added shelf label, and
wherein the identifying further comprises obtaining the location of the added shelf label, by the computer system, and using the distance to update the planogram.

9. The method according to claim 1, further comprising:
acquiring, by the reading device, a label identifier of the adjacent shelf label,
acquiring, by the reading device, a characteristic dimension of the location associated with the shelf label acquired the reading device,
transmitting, by the reading device, the characteristic dimension of the location with the label identifier to the computer system.

10. A non-transitory computer program product comprising program code instructions for updating a planogram registered in a computer system to reflect an addition of a shelf label in a shelf of a retail area, comprising:
acquiring, by a reading device, a sequence of label identifiers comprising a label identifier of an added shelf label reflecting an addition of the shelf label in the shelf of the retail area, and also comprising a label identifier of an adjacent shelf label which is adjacent to the added shelf label according to a scrolling direction of the locations of the retail area,
the retail area having a plurality of shelf labels distributed in the retail area, each of the shelf labels being associated with a respective article and being disposed near a respective location associated with the article, each of the shelf labels being associated with a label identifier of its own,
wherein the adjacent shelf label is either the preceding shelf label or the following shelf label in the shelf according to the scrolling direction and in relation to the added shelf label,
wherein a location of the adjacent shelf label is preliminarily known in the planogram;
identifying a location corresponding to the added shelf label in the shelf of the retail area, comprising:
transmitting, by the reading device, the sequence of label identifiers to the computer system,
updating, by the computer system, the planogram on the basis of the sequence of label identifiers, by determining:
the articles associated with the labels of the sequence of label identifiers, and
the respective locations of the articles, on the basis of an obtained location of the added shelf label, wherein the obtained location is a location in the planogram which is adjacent to the preliminarily known location of the adjacent shelf label.

11. A system for managing a planogram, the planogram comprising association data between articles of a retail area and locations of the retail area, the system comprising:
a plurality of electronic shelf labels, each of the shelf labels being associated with a label identifier of its own,
a reading device adapted to acquire the label identifiers of the plurality of electronic shelf labels and to acquire the references of the articles associated with the electronic shelf labels,
a computer system in which the planogram is registered, the computer system being configured to receive, from the reading device, a transmitted sequence of label identifiers, and being further configured to update the planogram by determining an obtained location of an added shelf label reflecting an addition of a shelf label of the retail area, wherein the obtained location is a location in the planogram which is immediately adjacent to the known location of the adjacent shelf label,
the reading device being configured to:
acquire a sequence of label identifiers comprising the label identifier of the added shelf label, and further comprising the label identifier of an adjacent shelf label which is adjacent to the added shelf label according to a scrolling direction of the locations of the retail area,
wherein the adjacent shelf label is either the preceding shelf label or the following shelf label in the shelf according to the scrolling direction and in relation to the added shelf label,
wherein a location of the adjacent shelf label is preliminarily known in the planogram, and
transmit the sequence of label identifiers to the computer system.

12. The system of claim 11, wherein the reading device is further configured to:
acquire an indication of relative positioning, relative to the location of the added shelf label and the adjacent label; and
transmit the indication to the computer system.

13. The system of claim 12, wherein the reading device is further configured to:
identify, from the acquisition order of the label identifiers of the sequence of label identifiers, the indication of relative positioning of the added shelf label, relative to the location of the adjacent label.

14. The system of claim 11, wherein the reading device is further configured to:
transmit to the computer system data corresponding to an association between the label identifier of the electronic and a reference of an article with which the added shelf label is associated with.

15. The system of claim 11,
wherein the added shelf label is one of a plurality of electronic shelf labels to be located, the electronic shelf labels to be located being adjacent to each other in the scrolling direction of the locations of the retail area, and wherein the reading device is further configured to: acquire the label identifiers of the plurality of electronic shelf labels to be located in the order of their arrangement.

16. The system of claim 15, wherein each electronic shelf label identified in the sequence is fitted with a radiofrequency peripheral, and wherein the reading device is further configured to: acquire the label identifiers of the electronic shelf labels by setting up communication via radiofrequency with the electronic shelf labels and the reading device.

17. The system of claim 11, wherein the reading device comprises a displacement measurement member, and wherein the reading device is further configured to:
Determine the displacement between the label identifier of the adjacent shelf label whereof the location is preliminarily known and the label identified of the added shelf label.

18. The system of claim 17, wherein the reading device is further configured to determine the distance between the adjacent shelf label and the added shelf label from the displacement of the reading device between the label identifier of the adjacent shelf label whereof the location is known, and the added shelf label.

19. The system of claim 18, wherein the computer system is configured to obtain the location of the added shelf label as a function of the preliminarily known location of the adjacent shelf label and as a function of the determined distance.

20. The system of claim 11, wherein the computer system is further configured to:
update the planogram on the basis of the sequence of label identifiers, by determining:
articles associated with the labels of the sequence of label identifiers, and
locations of the articles, on the basis of the obtained location of the added shelf label.

* * * * *

(12) INTER PARTES REVIEW CERTIFICATE (3994th)
United States Patent
Bottine et al.

(10) Number: US 11,010,709 K1
(45) Certificate Issued: Jun. 26, 2025

(54) METHOD FOR UPDATING ASSOCIATION DATA BETWEEN ARTICLES AND LOCATIONS

(71) Applicants: Philippe Bottine; François Robin

(72) Inventors: Philippe Bottine; François Robin

(73) Assignee: VUSIONGROUP

Trial Number:

IPR2024-00208 filed Nov. 21, 2023

Inter Partes Review Certificate for:

Patent No.: 11,010,709
Issued: May 18, 2021
Appl. No.: 15/747,550
Filed: Jan. 25, 2018

The results of IPR2024-00208 are reflected in this inter partes review certificate under 35 U.S.C. 318(b).

INTER PARTES REVIEW CERTIFICATE
U.S. Patent 11,010,709 K1
Trial No. IPR2024-00208
Certificate Issued Jun. 26, 2025

AS A RESULT OF THE INTER PARTES REVIEW PROCEEDING, IT HAS BEEN DETERMINED THAT:

Claims 1-20 are found patentable.

\* \* \* \* \*